United States Patent [19]

Matsuda

[11] Patent Number: 4,980,832
[45] Date of Patent: Dec. 25, 1990

[54] FAIL-SAFE SYSTEM FOR AN ANTI-SKID CONTROL SYSTEM FOR AN AUTOMOTIVE BRAKE SYSTEM

[75] Inventor: Toshiro Matsuda, Kanagawa, Japan
[73] Assignee: Nissan Motor Co., Ltd., Yokohama, Japan
[21] Appl. No.: 239,808
[22] Filed: Sep. 2, 1988

[30] Foreign Application Priority Data

Sep. 4, 1987 [JP] Japan .................................. 62-220459

[51] Int. Cl.$^5$ .............................................. B60T 8/88
[52] U.S. Cl. ................................ 364/426.02; 303/92; 303/95
[58] Field of Search ..................... 364/426.07; 303/92, 303/93, 95, 110; 180/197; 361/238

[56] References Cited

U.S. PATENT DOCUMENTS

| | | | |
|---|---|---|---|
| 3,883,184 | 5/1975 | Jonner et al. | 303/92 |
| 3,966,265 | 6/1976 | Taylor et al. | 303/92 |
| 4,013,324 | 3/1977 | Quon | 303/92 |
| 4,049,326 | 9/1977 | Zobel | 303/92 |
| 4,059,312 | 11/1977 | Jonner | 303/92 |
| 4,597,052 | 6/1986 | Matsuda | 364/550 |
| 4,656,588 | 4/1987 | Kubo | 364/426.02 |
| 4,660,146 | 4/1987 | Kubo | 364/426.02 |
| 4,663,715 | 5/1987 | Kubo | 364/426.02 |
| 4,663,716 | 5/1987 | Kubo | 364/426.02 |
| 4,665,491 | 5/1987 | Kubo | 364/565 |
| 4,669,045 | 5/1987 | Kubo | 364/426.02 |
| 4,669,046 | 5/1987 | Kubo | 364/426.02 |
| 4,674,049 | 6/1987 | Kubo | 364/426.02 |
| 4,674,050 | 6/1987 | Kubo | 364/426.02 |
| 4,679,146 | 7/1987 | Kubo | 364/426.02 |
| 4,680,713 | 7/1987 | Kubo | 364/426.02 |
| 4,680,714 | 7/1987 | Kubo | 364/426.02 |
| 4,682,295 | 7/1987 | Kubo | 364/426.02 |
| 4,704,684 | 11/1987 | Kubo | 364/426.02 |
| 4,718,013 | 1/1988 | Kubo | 364/426.02 |
| 4,789,938 | 12/1988 | Maehata et al. | 303/92 |

*Primary Examiner*—Gary Chin
*Attorney, Agent, or Firm*—Foley & Lardner, Schwartz, Jeffery, Schwaab, Mack, Blumenthal & Evans

[57] ABSTRACT

An anti-skid brake control system is designed to periodically generate short commands ordering an APPLICATION mode operation to increase braking pressure while the system operates in a RELEASE mode. An anti-skid control signal is then monitored to make a judgement that failure occurs in the anti-skid brake control system when the control signal is not periodically switched from RELEASE mode to APPLICATION mode.

14 Claims, 9 Drawing Sheets

FAIL-SAFE SYSTEM FOR AN ANTI-SKID CONTROL SYSTEM FOR AN AUTOMOTIVE BRAKE SYSTEM

BACKGROUND OF THE INVENTION

1. Field of the Invention

The present invention relates generally to an anti-skid control system for an automotive hydraulic brake system. More specifically, the invention relates to a fail-safe system in an anti-skid brake control system.

2. Description of the Background Art

As is well known, an anti-skid brake control system adjusts braking pressure for maintaining wheel slippage close to an optimal level, i.e. 10 to 20%. For establishing this, it is usual anti-skid control operation to perform cycles of brake control operation to hold the braking pressure constant until the wheel slippage increases across a predetermined wheel slip criterion, reduce the braking pressure for resuming wheel speed and thereby recovering wheel slippage below the predetermined wheel slip criterion, holding the reduced braking pressure until wheel speed is increased to be coincident with a vehicular speed, and increasing braking pressure.

Because of an automotive brake system is essential element for assuring safe driving of the vehicle, various fail-safe systems have been developed and proposed for preventing the vehicle from falling into a dangerous state even when anti-skid brake control fails. For example, Japanese Patent First (unexamined) Publication (Tokkai) Showa 58-53551 discloses a fail-safe system for an anti-skid brake control system, which monitors a period of time in which the operational mode of the anti-skid brake control system is maintained in RELEASE mode to decrease the braking pressure, and detects the peroid longer than a predetermined possible maximum RELEASE period for detecting failure of the system. Though such fail-safe system generally operates well for preventing the vehicle from falling into danger, improvement is required for obtaining a further higher safety level.

SUMMARY OF THE INVENTION

Therefore, it is an object of the present invention to provide an anti-skid brake control with a fail-safe system which has an improved higher fail detection capability.

In order to accomplish aforementioned and other objects, an anti-skid brake control system, according to the present invention, is designed to periodically generate a short command ordering an APPLICATION mode operation to increase braking pressure while the system operates in RELEASE mode. An anti-skid control signal is then monitored to make judgement that failure occurs in the anti-skid brake control system, when the control signal is not periodically switched from RELEASE mode to APPLICATION mode.

According to one aspect of the invention, a fail-safe system for an anti-skid brake control system, comprises:

a hydraulic brake circuit having means for building up braking fluid pressure according to an operational magnitude of a manually operable braking member, means, associated with a vehicular wheel, for generating braking force to decelerate the vehicular wheel;

a pressure adjusting means, disposed within the hydraulic circuit, for adjusting pressure of a working fluid to be delivered to the braking force generating means, the pressure adjusting means being operable at least in a first mode for increasing braking pressure in the braking force generating means and in a second mode for decreasing the braking pressure;

a sensor means for monitoring rotation speed of the vehicular wheel to produce a sensor signal representative of the rotation speed of the vehicular wheel;

controller means for processing the wheel speed indicative data in order to derive a wheel slippage on the basis of the wheel speed indicative data and a control signal for the pressure adjusting means for switching the operational mode between the first and second modes so as to maintain wheel slippage close to a predetermined value;

pulse generator means, associated with the controller means, for periodically generating a pulse signal having a substantially short pulse width, the pulse signal being combined with the control signal for periodically modifying the control signal to order the first mode;

detector means for detecting an interval of periodically occurring control signal ordering the first mode longer than a predetermined period to produce a fail detection signal; and fail-safe means, responsive to the fail detection signal, for performing fail-safe operation to fix the pressure adjusting means at the first mode.

According to another aspect of the invention, a fail-safe system for an anti-skid brake control system, comprises:

a hydraulic brake circuit having means for building up braking fluid pressure according to an operational magnitude of a manually operable braking member, means, associated with a vehicular wheel, for generating braking force to decelerate the vehicular wheel;

a pressure adjusting means, disposed within the hydraulic circuit, for adjusting pressure of a working fluid to be delivered to the braking force generating means, the pressure adjusting means being operable in a first mode for increasing braking pressure in the braking force generating means and in a second mode for decreasing the braking pressure and in a third mode for holding the braking pressure constant;

a sensor means for monitoring rotation speed of the vehicular wheel to produce a sensor signal representative of the rotation speed of the vehicular wheel;

controller means for processing the wheel speed indicative data in order to derive a wheel slippage on the basis of the wheel speed indicative data and a control signal for the pressure adjusting means for switching the operational mode between the first and second modes so as to maintain wheel slippage close to a predetermined value, the control signal being variable between a first level ordering the first mode, a second level ordering the second mode and a third level ordering the third mode;

pulse generator means, associated with the controller means, for periodically generating a pulse signal having a substantially short pulse width, the pulse signal being combined with the control signal for periodically modifying a signal level of the control signal to the first level;

detector means for detecting an interval of periodically occurring first level control signal longer than a predetermined period to produce a fail detection signal; and fail-safe means, responsive to the fail detection signal, for performing fail-safe operation to fix the control signal at the first level.

In the preferred construction, the pulse generator means is active while the pressure adjusting means is in the second mode for periodically producing a control signal at the first level. The detector means comprises an integrator circuit which integrates a period while the pressure adjusting means is maintained in the second mode, and a comparator receiving the integrated value of the integrator circuit to compare with a reference value representative of the predetermined period to produce the fail detection signal when the integrated value becomes greater than or equal to the reference value.

Preferably, the fail-safe system may further comprise means for holding the fail detection signal throughout vehicular driving. The fail detection signal holding means is reset in response to turning ON an ignition switch.

As will be naturally appreciated, the predetermined period is set at a longer period than an interval of the periodically generated pulse signal.

DESCRIPTION OF THE PREFERRED EMBODIMENT

Figure 1A:
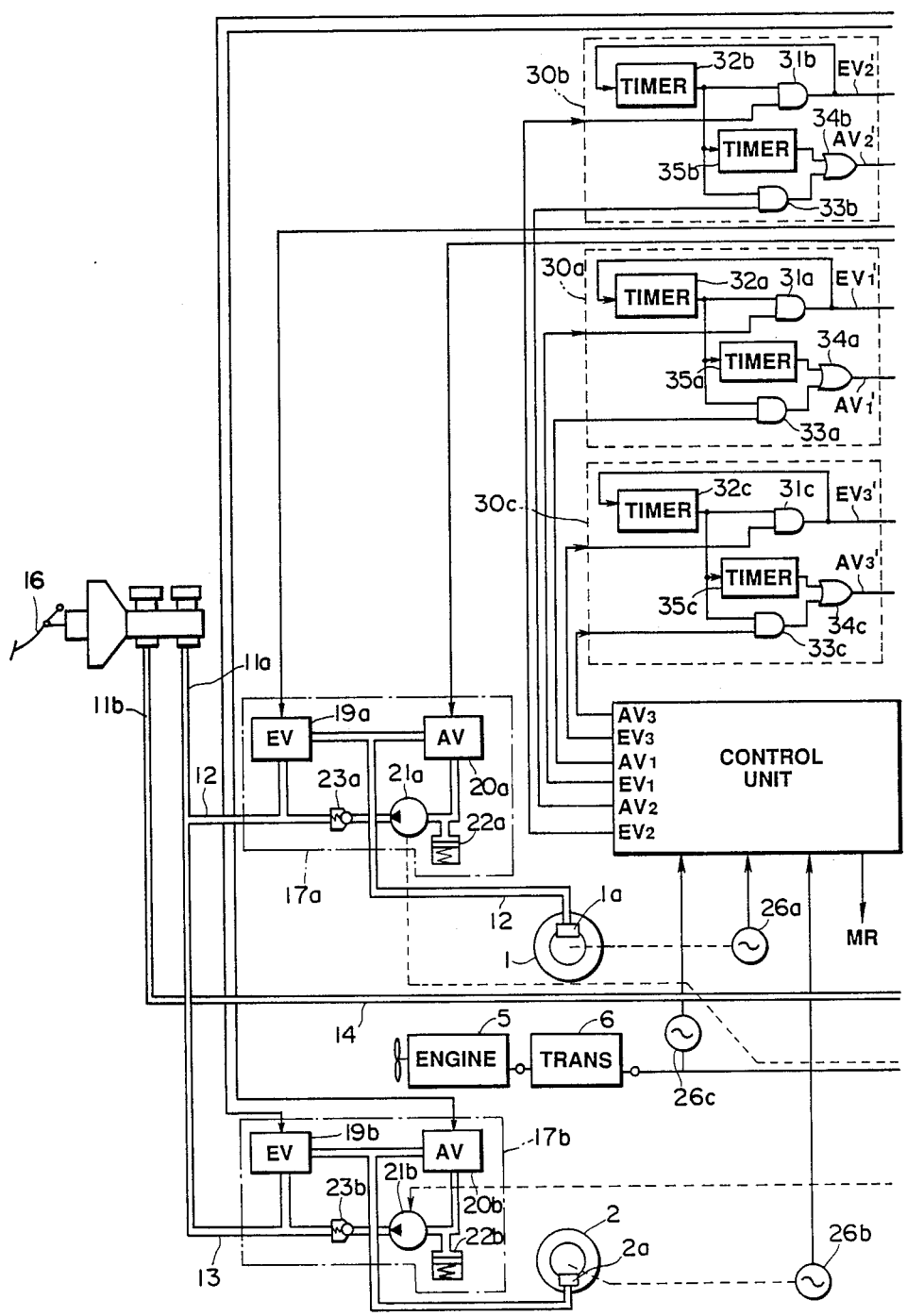
FIGS. 1(A) and 1(B) are schematic block diagrams of the preferred embodiment of an anti-skid brake control system which incorporates the preferred embodiment of a fail-safe system, according to the present invention.
Figure 1B:
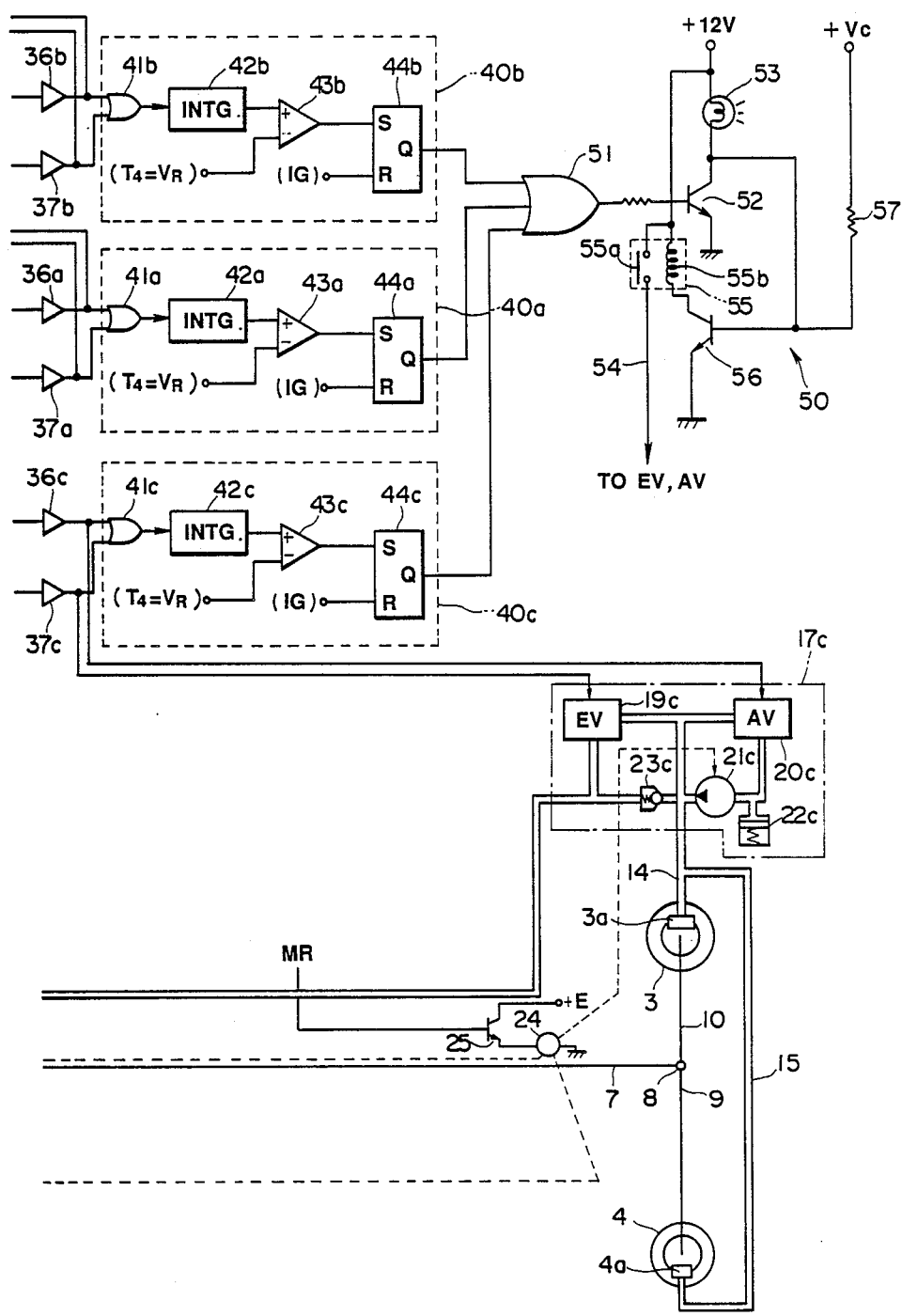
Figure 2A:
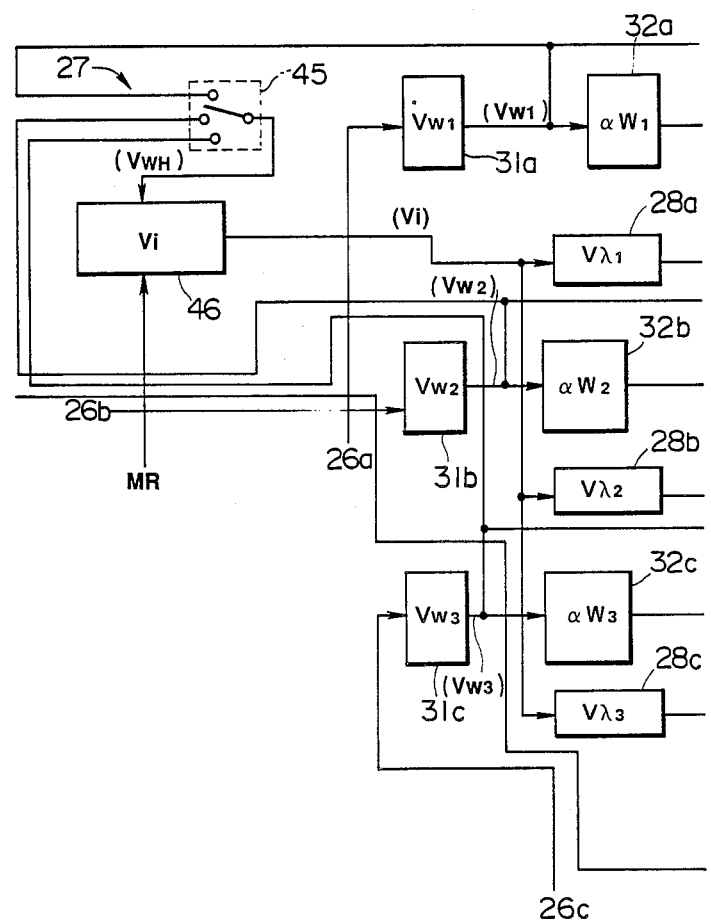
FIGS. 2(A) and 2(B) are block diagrams of the preferred construction of a control unit which performs anti-skid brake control.
Figure 2:
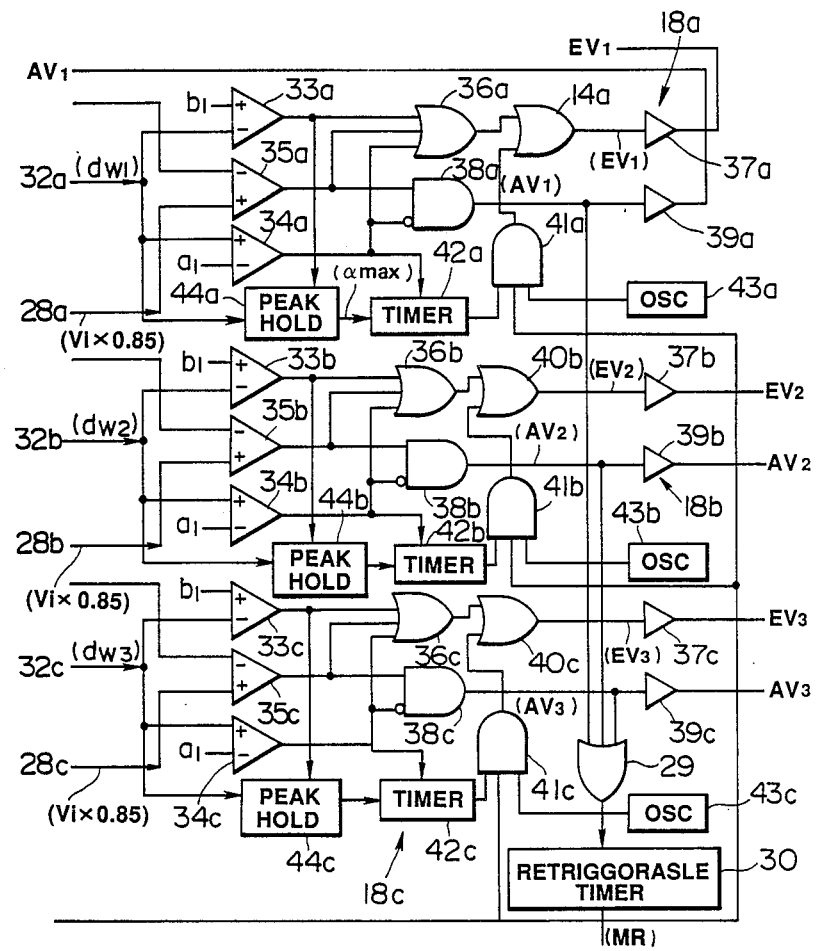

Referring now to the drawings, particularly to FIGS. 1 and 2, the preferred embodiment of an anti-skid brake control system, according to the present invention, is designed for controlling braking pressure to be exerted on respective front and rear vehicular wheels 1, 2, 3 and 4. Each of the front and rear wheels 1, 2, 3 and 4 are co-operated with wheel cylinders 1a, 2a, 3a and from the control unit 18 between a closed position and an open position. Furthermore, the fluid pump 21a is connected to the control unit 18 to receive a pump drive signal MR to be controlled between driving condition and resting condition.

In the preferred embodiment, the EV valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mode. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the EV valve 19a. Therefore, the braking fluid pressure in the wheel cylinder 1a is increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the AV valve 20a. As a result, fluid communication between the wheel cylinder 1a and the accumulator 22a is established. At the same time, the pump drive signal MR turns into HIGH to drive the fluid pump 21a. Therefore, the fluid pressure in accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set HIGH level to close the EV valve 19a and the outlet control signal $AV_1$ is set LOW level to maintain the AV valve 20a at closed position. Therefore, the wheel cylinder 1a is blocked from fluid communication between the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|        | APPLICATION | RELEASE | HOLD |
|--------|-------------|---------|------|
| $EV_1$ | LOW         | HIGH    | HIGH |
| $AV_1$ | LOW         | LOW     | HIGH |
| MR     | —           | —       | HIGH |

As set forth, the pressure control valve assemblies 17b and 17c are of identical constructions and operations as that set forth above with respect to the pressure control valve assembly 17a. For the sake of illustration, each component in the pressure control valve assemblies 17b and 17c are identified the same reference numerals with corresponding suffixes (b, c).

The control unit 18 is connected to wheel speed sensors 26a, 26b and 26c for receiving a pulse signal having frequency proportional to the rotation speed of the associated wheels 1, 2, 3 and 4. In practice, each of the wheel speed sensors 26a and 26b comprises a sensor rotor adapted to rotate with the vehicle wheel and a sensor assembly fixedly secured to the shim portion of the knucle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with the north pole near the sensor rotor and the south pole distal from the sensor rotor. A metal element with a smaller diameter section is attached to the end of the magnetic core near the sensor rotor. The free end of the metal element faces the sensor teeth. An electromagnetic coil encircles the smaller diameter section of the metal element. The electromagnetic coil is adapted to detect variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such a wheel speed sensor has been disclosed in U.S. Pat. No. 4,597,052, issued on June 24, 1986, for example. The disclosure of the U.S. Pat. No. 4,597,052 is herein incorporated by reference for the sake of disclosure.

On the other hand, the wheel speed sensor 26c is associated with the propeller shaft 7 for producing a frequency signal having a frequency proportional to the rotation speed of the propeller shaft. The practical construction of the propeller shaft associated wheel speed sensor 26c is similar to that of the wheel speed sensors 26a and 26b. Therefore, detailed discussion about the construction of the wheel speed sensor 26c will not be given in view of simplification of the disclosure.

The control unit 18 has a controller circuit sections 18a, 18b and 18c for outputting inlet and outlet control signals. The controller circuit section 18a is designed to produce the inlet and outlet control signals $EV_1$ and $AV_1$ for the pressure control valve assembly 17a on the basis of the wheel speed indicative pulse signal from the wheel speed sensor 26a and representative of the rotation speed of the right-front wheel 1. Similarly, the controller circuit section 18b is designed to produce the inlet and outlet control signals $EV_2$ and $AV_2$ for the pressure control valve assembly 17b on the basis of the wheel speed indicative pulse signal output from the wheel speed sensor 26b and representative of the rotation speed of the left-front wheel 2. The controller circuit section 18c is designed to produce the inlet and outlet control signals $EV_3$ and $AV_3$ for the pressure control valve assembly 17c on the basis of the pulse signal from the wheel speed sensor 26c and representative of the rotation speed of the propeller shaft 7 which is, in other words, representative of an average rotation speed of the right-rear and left-rear wheels 3 and 4.

As the anti-skid brake control valves 17a, 17b and 17c, the controller circuit sections 18a, 18b and 18c are essentially of identical circuit constructions. Therefore, the following discussion will be given only for the controller circuit section 18a. The corresponding circuit elements in the controller circuit sections 18b and 18c are represented by the same reference numerals with different suffixes which identifies the section to include the circuit elements.

As will be seen from FIGS. 1 and 2, the controller circuit section 18a includes a wheel speed derivation circuit 31a and a wheel acceleration derivation circuit 32a. The wheel speed derivation circuit 31a receives the wheel speed indicative pulse signal from the wheel speed sensor 26a. Based on the frequency or pulse period of the wheel speed indicative pulse signal of the wheel speed sensor 26a and rotation radius of the right-front wheel, the wheel speed derivation circuit 31a derives an angular velocity of the right-front wheel and thereby derives an instantaneous wheel speed $Vw_1$ of the right-front wheel 1. The wheel speed derivation circuit 31a produces a wheel speed signal indicative of the derived wheel speed $Vw_1$. The wheel acceleration derivation circuit 32a receives the wheel speed signal from the wheel speed derivation circuit 31a. The wheel acceleration derivation circuit 32a derives wheel acceleration $\alpha w_1$ and produces a wheel acceleration indicative signal. Derivation of the wheel acceleration $\alpha w_1$ based on the variation of wheel speed $Vw_1$ indicated in the wheel speed signal, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052. Manners of derivation of the wheel speed $Vw_1$ and wheel acceleration $\alpha w_1$ have also been disclosed in:

U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,674,050, issued on June 16, 1987
U.S. Pat. No. 4,680,714, issued on July 12, 1987
U.S. Pat. No. 4,682,295, issued on July 21, 1987
U.S. Pat. No. 4,680,713, issued on July 14, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986

All sixteen prior published U.S. Patents are issued to common applicant, i.e. Jun KUBO and commonly assigned to the common assignee to the present invention. The disclosures of the above-listed U.S. Patents are herein incorporated by reference for the sake of disclosure.

The wheel acceleration indicative signal of the wheel acceleration derivation circuit 32a is transmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is further connected to a peak detector circuit 44a which is designed for detecting a peak value of the wheel acceleration $\alpha w_1$ and holds the peak value.

The non-inverting input terminal of the comparator 33a is connected to a reference signal generator (not shown) for receiving therefrom a deceleration threshold indicative reference signal $-b$. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold $-b$. The comparator 33a is responsive to the wheel acceleration $\alpha w_1$ dropping across the deceleration threshold $-b$ to output a HIGH level comparator signal.

The inverting input terminal of the comparator 34a is connected to a reference signal generator (not shown)

which generates an acceleration threshold indicative reference signal having a value indicative of a predetermined wheel acceleration threshold +a. The comparator 34a thus compares the wheel acceleration $\alpha w_1$ as indicated in the wheel acceleration indicative signal of the wheel acceleration derivation circuit 32a with the wheel acceleration threshold +a. The comparator 34a generally outputs a LOW level comparator signal while the wheel acceleration $\alpha w_1$ is held lower than the wheel acceleration threshold +a. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected to the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed $V\lambda$ on the basis of a vehicle speed representing value Vi which is derived by a projected vehicle speed representing data derivation circuit 46 and a desired optimum wheel slippage for optimizing vehicular braking efficiency. As is well known, the vehicular braking efficiency becomes maximum in a wheel slippage range of 10% to 20%. In the practical embodiment, the target wheel slippage $\lambda$ is set at 15%. On the other hand, the vehicle speed representing value Vi is derived on the basis of an instantaneous wheel speed Vw at the beginning of each cycle of anti-skid brake control. The procedure of derivation of the vehicular speed representing value Vi is discussed later. The target wheel speed $V\lambda$ is derived at a value of 85% of the vehicle speed representing value Vi to indicate 15% of wheel slippage. The comparator 35a maintains a LOW level comparator signal while the wheel speed Vw is maintained higher than the target wheel speed $V\lambda$. On the other hand, the comparator signal level of the comparator 35a turns HIGH when the wheel speed Vw drops across the target wheel speed $V\lambda$.

The comparator signals of the comparators 33a and 34a and 35a are fed to input terminals of an OR gate 36a. The comparator 34a and 35a are also connected to an AND gate 38a to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to an oscillator 43a which is designed to generate a given constant frequency of pulse signals. The other input terminal of the AND gate 41a is connected to a retriggerable timer circuit 30 which is designed for producing a pump drive signal MR for driving the fluid pump 21a, 21b and 21c by applying the pump drive signal MR to pump drive motor 24 through a switching transistor 25.

The OR gate 36a and the AND gate 41a are connected to an OR gate 40a which serves to output the inlet control signal $EV_1$. The output terminal of the OR gate 40a is connected to the EV valve 19a of the anti-skid control valve assembly 17a via an amplifier 37a. On the other hand, the AND gate 38a serves to output the outlet control signal $AV_1$ to feed the outlet control signal to the AV valve 20a of the anti-skid control valve assembly 17a, via an amplifier 39a.

The projected vehicle speed representing data derivation circuit 46 is connected to the wheel speed derivation circuit 31a to receive therefrom the wheel speed signal from time-to-time. The projected vehicle speed representing data derivation circuit 46 is also connected to the retriggerable timer circuit 30. The projected vehicle speed representing data derivation circuit 46 is designed to latch an instantaneous wheel speed Vw as an initial vehicle speed representing value $Vi_1$ in response to the leading edge of a HIGH level timer signal serving as the pump drive signal MR. The projected vehicle speed representing value derivation circuit 46 derives the vehicle speed representing value $Vi_1$ on the basis of the initial vehicle speed representing value corresponding to the latched wheel speed value $Vw_1$ as set forth above.

The projected vehicle speed representing data derivation circuit 46 is also connected to a selec-HIGH switch 45 having three terminals respectively connected to the wheel speed derivation circuits 31a, 31b and 31c. The select HIGH switch 45 selects the greatest value among three wheel speed representing values $Vw_1$, $Vw_2$ and $Vw_3$ from respective wheel speed derivation circuits 31a, 31b and 31c and outputs the selected value as a common wheel speed representing data Vw. The common wheel speed representing data Vw is transferred to the projected vehicle speed representing data derivation circuit 46. Therefore, the projected vehicle speed representing data derivation circuit 46 derives the projected vehicular speed representing data Vi on the basis of the common wheel speed representing data Vw. The projected vehicular speed representing data Vi is delivered to the target wheel speed derivation circuits 28a, 28b and 28c of respective controller circuit sections 18a, 18b and 18c.

Figure 3A:
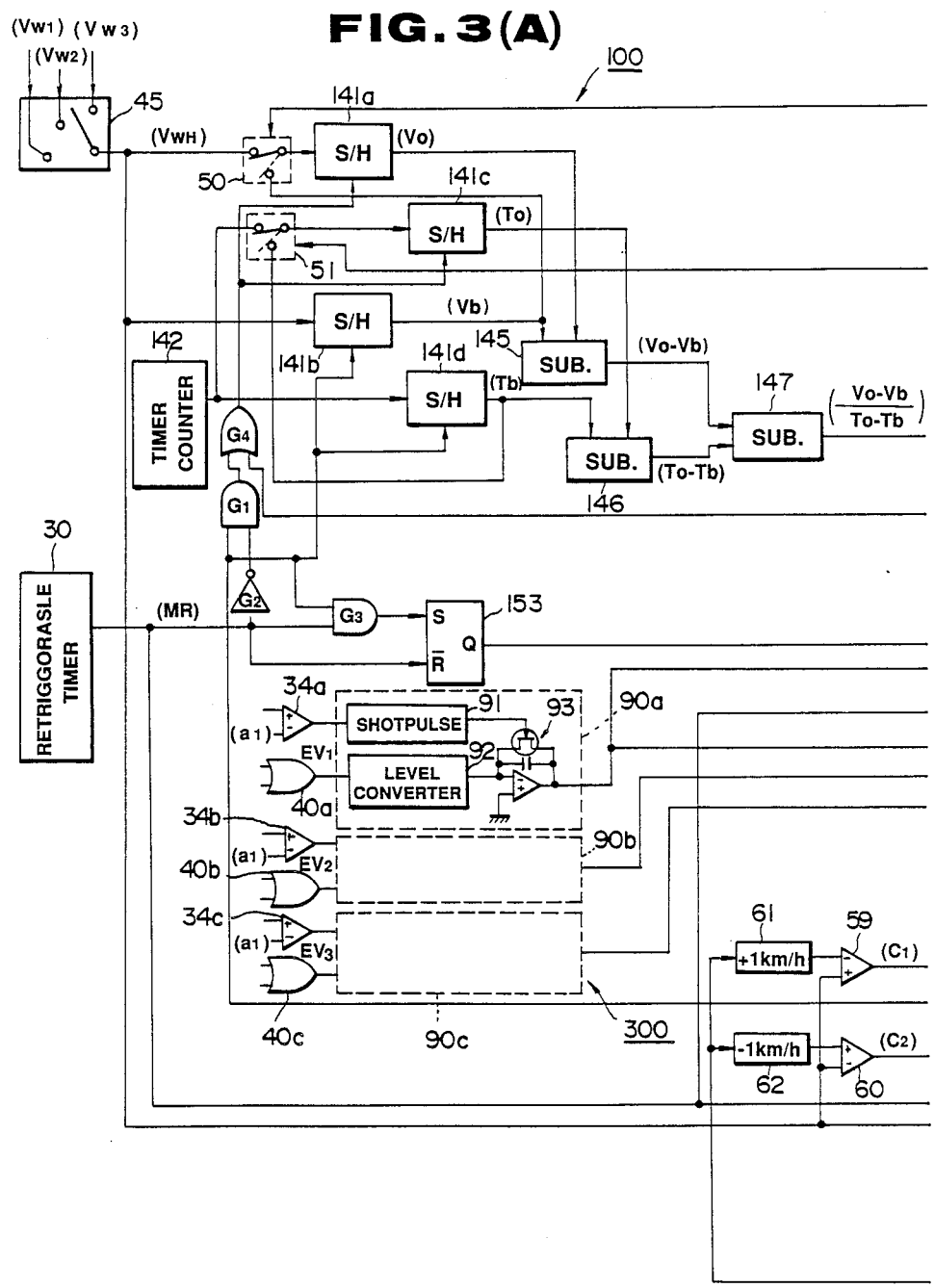
FIGS. 3(A) and 3(B) are block diagrams of one example of a projected vehicular speed representative data derivation circuit to be employed in the shown embodiment of the control unit.
Figure 3B:
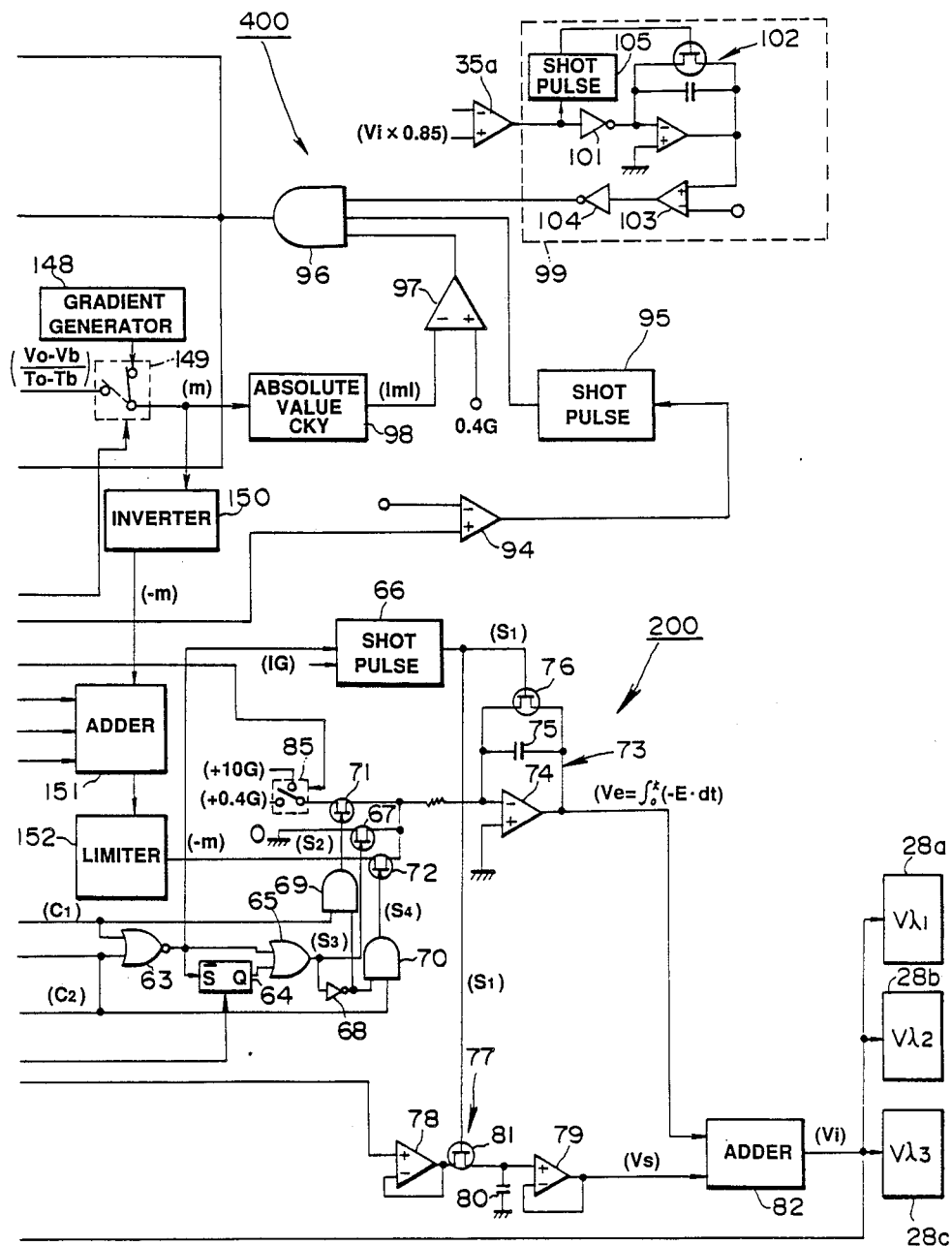

FIGS. 3(A) and 3(B) shown the detailed construction of the projected vehicular speed representing data derivation circuit 46. The projected vehicular speed representing data derivation circuit 46 generally comprises a basic gradient derivation stage 100, a projected vehicular speed representing data derivation stage 200, a re-application detecting stage 300 and a basic gradient correcting stage 400.

The basic gradient derivation stage 100 includes sample/hold circuits 141a, 141b, 141c and 141d. The sample/hold circuit 141a is connected to the select-HIGH switch 45 via a switch 50. The switch 50 selectively connects the sample/hold circuit 141a to the select-HIGH switch 45 and to a subtractor 145 which will be discussed later. Similarly, the sample/hold circuit 141c is connected to the select-HIGH switch 45 via a switch 51. The switch 51 selectively connects the sample/hold circuit 141c to the timer counter 142 and to a subtractor 146 which will be discussed later. On the other hand, the sample/hold circuit 141b is directly connected to the select-HIGH switch 45 to constantly receive the common wheel speed representing data Vw. The sample/hold circuit 141d is connected to a timer counter 142 which is connected to a clock generator (not shown) to count up a periodic timing pulse from the clock generator and having a constant frequency, to output a timer signal. The sample/hold circuit 141d samples and holds the timer signal value of the timer counter 142.

The sample/hold circuits 141a and 141c are connected to an OR gate G4 which has one input terminal connected to an AND gate G1 and the other input terminal connected to an AND gate 96 in the basic gradient correcting stage 400 which will be discussed later. One input terminal of the AND gate G1 is connected to a comparator 60 which will be discussed later, in the projected vehicular speed derivation stage 200 in order to receive a C2 signal therefrom. The other input terminal of the AND gate G1 is connected to the retriggerable timer 30 via an inverter G2 in order to receive inverted MR signal. Therefore, the output of the OR gate G4 serves as sample/hold control command for the sample/hold circuits 141a and 141c. On the other hand, the sample/hold circuits 141b and 141d are directly connected to the comparator 60 to receive the C2 signal therefrom as the sample/hold control command.

With the arrangement set forth above, the sample/hold circuit 141a is responsive to the HIGH level output of the OR gate G4 to hold the common wheel speed representing data Vw. On the other hand, the sample/hold circuit 141b operates in synchronism with the C2 signal to hold the common wheel speed representing data Vw. Similarly, the sample/hold circuit 141c is responsive to the HIGH level output of the OR gate G4 to hold the common wheel speed representing data Vw. On the other hand, the sample/hold circuit 141d operates in synchronism with the C2 signal to hold the timer signal value.

The sampled common wheel speed representing data V0 in the sample/hold circuit 141a, which data will be hereafter referred to as "V0 data", and the sampled common wheel speed representing data Vb of the sample/hold circuit 141b which data will be hereafter referred to as "Vb data", are fed to the subtractor 145 when the switches 50 and 51 are both switched to connect the sample/hold circuits to the subtractor as controlled by the output of the AND gate 96. On the other hand, the sampled timer value T0 of the sample/hold circuit 141c which timer value will be hereafter referred to as "T0 timer value", and the sampled timer value Tb of the sample/hold circuit 141d which will be hereafter referred to as "Tb timer value", are fed to the subtractor 146.

The subtractor 145 derives a wheel speed difference data $\Delta V$ (=V0−Vb) based on the input V0 data and Vb data. On the other hand, the subtractor 146 derives a time difference data $\Delta T$ (=T0−Tb) on the basis of the input T0 timer value and the Tb timer value. The wheel speed difference data $\Delta V$ of the subtractor 145 and the time difference data $\Delta T$ of the subtractor 146 are fed to a divider 147. The divider 147 divides the wheel speed difference data $\Delta V$ by the time difference data $\Delta T$ to derive a basic gradient value m.

The divider 147 is connected to an absolute value circuit 98 of the basic gradient correction stage 400 and to an inverting circuit 150 via a switching circuit 149. To the switching circuit 149, a gradient signal generator circuit 148 which is designed to produce a fixed gradient indicative signal for the first skid cycle. In the preferred embodiment, the gradient signal generator circuit 148 produces the fixed gradient indicative signal representing preset vehicular deceleration magnitude, e.g. 0.4 G. The switching circuit 149 is connected to a flip-flop circuit 153 to receive the output therefrom as a switching command. The flip-flop 153 has a set input terminal connected to an AND gate G3 which has one input terminal connected to the comparator 60 and the other input terminal connected to the retriggerable timer 30. With this arrangement, the flip-flop is set in response to the leading edge of the HIGH level signal of the AND gate G3. The flip-flop 153 also has a reset input terminal connected to the retriggerable timer 30 to be reset in response to the trailing edge of the MR signal. The flip-flop 153 outputs HIGH level output while it is held at set position and LOW level output while it is held at reset position. Therefore, at the first skid cycle, the switching circuit 149 is maintained in a position illustrated by the solid line in FIG. 3 to connect the gradient signal generator circuit 148 to the absolute value circuit 98 and the inverting circuit 150. On the other hand, in the subsequent skid cycles, the switching circuit 149 is switched at the switch position as illustrated by the broken line to connect the divider circuit 147 to the absolute value circuit 98 and the inverting circuit 150.

The inverter circuit 150 performs inversion for the basic gradient indicative signal output through the switching circuit 149 to "−m". The inverted basic gradient indicative signal −m is input to an adder circuit 151 which will be discussed later.

The projected vehicular speed derivation stage 200 includes a comparator 59 which has a non-inverting input terminal connected to the select-HIGH switch 45 to receive therefrom the common wheel speed representing data Vw. The comparator 59 also has an inverting input terminal connected to an upper deadband reference signal generator circuit 61 to receive therefrom an upper deadband reference signal Vi+ which has a value greater than the projected vehicular speed representing data Vi by 1 km/h. The comparator 59 thus outputs HIGH level comparator signal C1 when the common wheel speed representing data Vw is greater than or equal to the upper deadband reference signal value Vi+ and LOW level comparator signal when the common wheel speed representing data is smaller than the upper deadband reference signal value. As set forth, the projected vehicular speed derivation circuit 200 also has the comparator 60 which has an inverting input terminal connected to the select-HIGH switch 45 and a non-inverting input terminal connected to a lower deadband reference signal generator circuit 62. The lower deadband reference signal generator circuit 62 produces a lower deadband reference signal Vi− which represents a value smaller than the projected vehicular speed representing data Vi by 1 km/h. The comparator 60 thus output HIGH level comparator signal C2 when the common wheel speed representing data Vw is smaller than the lower deadband reference signal value Vi− and LOW level common wheel speed representing data Vw is greater than or equal to the lower deadband reference signal value Vi−. The comparators 59 and 60 are connected to a NOR gate 63. The NOR gate 63 thus output HIGH level gate signal only when both of the inputs from the comparators 59 and 60 are LOW level. Namely, when the common wheel speed representing data Vw is held smaller than the upper deadband reference signal value Vi+ and is greater than or equal to the lower deadband reference signal value Vi−, the gate signal of the NOR gate 63 becomes HIGH. The inverting output terminal of the NOR gate 63 is directly connected to one input terminal of an OR gate 65 and connected to the other input terminal of the OR gate 65 via a timer 64. The timer 64 is responsive to trailing edge of the HIGH level gate signal of the NOR gate 63 to output HIGH level signal for a period which is variable depending upon presence and absence of the MR signal of the retriggerable timer 30. In the preferred embodiment, the timer 64 output HIGH level signal for about 0.1 sec. while the MR signal is absent and for about 5 sec. while the MR signal present. Therefore, the gate output of the OR gate 65 is maintained HIGH level for the period while the output of the timer 64 is held HIGH level, after changing the signal level of the gate signal of the NOR gate 63 from HIGH to LOW level.

Preferably, the timer 64 is provided with the capability of varying the preset period in which the HIGH level timer signal is generated. For example, the set $T_3$ period of the timer 64 may be shortened while the MR signal of the retriggerable timer 30 is maintained HIGH level, than that is used while the MR signal is held LOW. This will further improve response in variation of the vehicular speed representive data.

The OR gate 65 is directly connected to an analog switch 67 and to one input terminal of an AND gate 70 via an inverter 68. The output terminal of the AND gate 70 is connected to an analog switch 72. The other input terminal of the AND gate 70 is connected to the output terminal of the comparator 60. The output of the OR gate 65 is also fed to one input terminal of an AND gate 69 via the inverter 68, which AND gate has an output terminal connected to an analog switch 71. The other input terminal of the AND gate 69 is connected to the output terminal of the comparator 59.

In the practical embodiment, the analog switches 67, 70 and 71 comprises a MOS transistor having gate electrode connected to the OR gate 65, the AND gate 70 and the AND gate 69 respectively. The AND gates 69 and 70 outputs gate signals $S_4$ and $S_2$ for switching the associated analog switches 71 and 72 between ON and OFF. Similarly, the gate signal $S_3$ of the OR gate 65 serves as switching signal for the analog switch 67. The analog switch 71 as turned ON, connects an acceleration reference generator 85 to the inverting input terminal of an operational amplifier 74 in an integrator circuit 73. The acceleration reference generator 85 includes an internal switch for selectively outputting two mutually different acceleration reference signals. In the shown embodiment, one of the acceleration reference signals is set at a value corresponding to vehicular acceleration of 0.4 G and the other of the acceleration reference signals is set at a value corresponding to vehicular acceleration of 10 G. Theses two acceleration references represent possible maximum vehicular acceleration. The internal switch of the acceleration reference generator 85 is connected to the retriggerable timer 30 so that it selects 0.4 G as the acceleration reference signal when the MR signal of the retriggerable timer 30 is held LOW and selects 10 G as the acceleration reference signal when the MR signal is absent. Therefore, when anti-skid brake control is not active, the acceleration reference signal is set at a value corresponding to the vehicular acceleration of 0.4 G and is set at the value corresponding to the vehicular acceleration 10 G during anti-skid control being active.

On the other hand, the analog switch 67 as turned ON, connects the inverting input terminal of the operational amplifier 74 of the integrator circuit 73 to the ground. Therefore, when the analog switch 67 is held ON, the input level at the inverting input terminal of the operational amplifier 74 becomes zero (0) level. When the analog switch 72 is turned ON, the inverting input terminal of the operational amplifier 74 is connected to a deceleration reference signal generator circuit 152. The deceleration reference signal generator circuit 152 generates a deceleration reference signal according to an input from a modified gradient generator circuit 151. The deceleration reference signal generator circuit 152 limits the value of the deceleration reference signal within a predetermined range defined by an upper limit value, e.g. −0.1 G, and a lower limit value, e.g. −1.2 G.

The integrator circuit 73 comprises a capacitor 75 and an analog switch 76 in addition to the operational amplifier 74. The circuit construction and operation of the integrator per se are well known to those skilled in the art and is adapted to integrate the input voltage input through the analog switches 67, 71 and 72. The integrator circuit 73 outputs an integrator signal having a value indicative of the integrated value Ve $$\left( = \int_0^t (-E) \times dt \right).$$

The analog switch 76 comprises a MOS transistor having a gate electrode connected to a one-shot pulse generator circuit 66. The one-shot pulse generator circuit 66 is connected to an ignition switch (not shown) and to the inverting output terminal of the NOR gate 63. Therefore, the one-shot pulse generator circuit 66 is triggered by the leading edge of the HIGH level ignition signal which is maintained HIGH level while the ignition switch is held ON and by the leading edge of the HIGH level output of the NOR gate 63. The one-shot pulse $S_1$ of the one-shot pulse generator circuit 66 serves as a reset signal for the integrator circuit 73 to clear the integrated value.

The one-shot pulse generator circuit 66 is further connected to an analog switch 81 in a sample/hold circuit 77. The sample/hold circuit 77 comprises buffer amplifiers 78 and 79, a capacitor 80 and the analog switch 81. As will be seen from FIG. 3, the sample/hold circuit 77 samples and holds the common wheel speed representative signal of the select-HIGH switch 45. The one-shot pulse $S_1$ of the one-shot pulse generator circuit 66 serves as a reset signal for the sample/hold circuit 77 to clear the held value therein and updated by the instantaneous common wheel speed representative value.

The integrated value Ve of the integrator circuit 73 and the sampled value Vs of the sample/hold circuit 77 are input to an adder circuit 82. The adder circuit 82 adds the integrated value Ve to the sampled value Vs to derive the projected vehicular speed representative data Vi to be fed to the target wheel speed derivation circuits 28a, 28b and 28c.

The re-application detecting stage 300 comprises application counters 90a, 90b and 90c. Each of the application counters 90a, 90b and 90c is of identical construction to the others. Therefore, only the application counter 90a is illustrated and discussed in detail.

The application counter 90a has a one-shot pulse generator circuit 91 and a level converter circuit 92. The one-shot pulse generator circuit 91 is connected to the output terminal of the comparator 34a and is responsive to the trailing edge of the HIGH level comparator signal of the comparator 34a to generate a one-shot pulse. On the other hand, the level converter circuit 92 is connected to an OR gate 40a to receive therefrom the inlet control signal $EV_1$. The level converter 92 adjusts the level of the inlet control signal $EV_1$ and feeds to an integrator circuit 93 which includes an operational amplifier, a capacitor and an analog switch. The integrator circuit 93 integrates the adjusted level of the inlet control signal EV to output the integrated value indicative signal to the adder circuit 151 and to a comparator 94 in the basic gradient correcting stage 400. As will be appreciated, the integrated value of the integrator circuit 93 represents the magnitude of increasing of the braking pressure in the right-front wheel cylinder $1a$ in APPLICATION mode. The analog switch of the integrator circuit 93 is reset by the one-shot pulse of the one-shot pulse generator circuit 91.

Though the application counter $90a$ which monitors re-application (re-entry into APPLICATION mode) in the right-front wheel 1, is connected to the comparator 94, it is possible to selected one of the application counters $90a$, $90b$ and $90c$ to the comparator. Therefore, the specific circuit construction shown in FIG. 3 is to be regarded as an example of implementation of the present invention. The application counter $90a$ detects the trailing edge of the inlet control signal $EV_1$ to count up the occurrence. This count value of the application counter $90a$ serves as a value representative of magnitude of increase of the braking fluid pressure in the right-front wheel cylinder $1a$. Similarly, respective application counters $90b$ and $90c$ count up occurrence of termination of APPLICATION mode and thereby monitor increasing magnitude of the braking fluid pressure.

The comparator 94 of the basic gradient correcting stage 400 has a non-inverting input terminal connected to the output of the integrator circuit 93 of the re-application detecting stage 300. The comparator 94 also has an inverting input terminal connected to a threshold generator (not shown) to receive therefrom a predetermined HIGH/LOW friction road criterion. Therefore, when the integrated value indicative signal of the integrator circuit 93 is greater than or equal to the HIGH/LOW friction road criterion, which represents higher friction than a criterion friction represented by the HIGH/LOW friction road criterion, the comparator 94 produces a HIGH level comparator signal. The output terminal of the comparator 94 is connected to a one-shot pulse generator circuit 95 which is responsive to trailing edge of the HIGH level comparator signal of the comparator 94 to generate the one-shot pulse. The one-shot pulse thus produced by the one-shot pulse generator circuit 95 is fed to one of the input terminals of an AND gate 96. The AND gate 96 has three input terminals. Another input terminal of the AND gate 96 is connected a comparator 97 which compares the output of the absolute value circuit 98 representative of the absolute value $|m|$ of the basic gradient indicative data m with a preset value, e.g. 0.4 G. The other input terminal of the AND gate 96 is connected to a NOT gate 104 of a lock period measuring circuit 99.

The lock period measuring circuit 99 comprises a one-shot pulse generator circuit 105, an inverter 101 and an integrator circuit 102. The one-shot pulse generator 105 is connected to the comparator $35a$. The comparator $35a$ is also connected to the integrator circuit 102 via a NOT gate 101. The NOT gate 101 inverts the output of the comparator $35a$ to input to the integrator circuit 102. The one-shot pulse generator circuit 105 is triggered by the leading edge of the HIGH level comparator signal of the comparator $35a$ to output the one-shot pulse to reset the integrator 102. The integrator circuit 102 is connected to a non-inverting input terminal of a comparator 103. The integrator circuit 102 is reset by the shot pulse of the one-shot pulse generator circuit 105 and integrates the inverted input from the comparator $35a$ which is inputted via the inverter 101. The comparator 103 has an inverting input terminal to receive the HIGH/LOW friction road criterion to output a HIGH level comparator signal as long as the integrated value from the integrator circuit 102 is greater than or equal to the HIGH/LOW friction road criterion. The output of the comparator 103 is fed via the NOT gate 104 in inverted form.

The AND gate 96 is responsive to satisfying of the AND condition of the three inputs set forth above to output a HIGH level gate signal. The gate signal of the AND gate 96 is connected to the switches 50 and 51 and also to the OR gate G4. By the input to the sample/hold circuits $141a$ and $141c$ via the OR gate G4 from the AND gate 96, the sampled values $V_0$, $T_0$, to $V_b$ and $T_b$ are sampled by the sample/hold circuits $141b$ and $141d$. By this the basic gradient to be derived by the basic gradient derivation stage 100 can be corrected.

Figure 4:
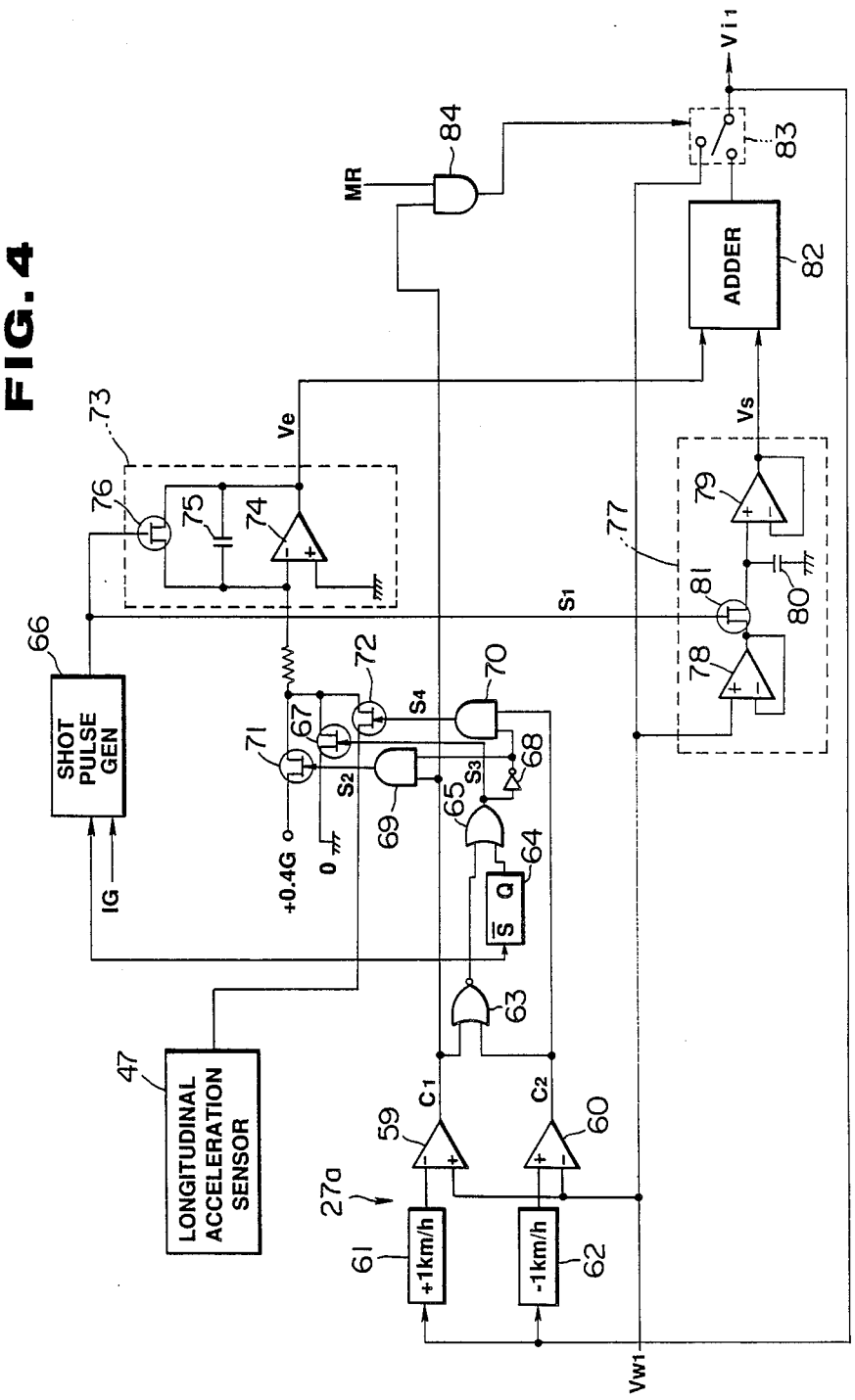
FIG. 4 is a block diagram of another example of a projected vehicular speed representative data derivation circuit to be employed in the shown embodiment of the control unit.

FIG. 4 shows the detailed construction of another embodiment of the vehicle speed representing data derivation circuit $27a$. As set forth above, the vehicle speed representing value derivation circuit $27a$ derives a vehicle speed representing value $Vi_1$ based on the wheel speed $Vw_1$ as indicated in the wheel speed signal from the wheel speed derivation circuit $31a$. The vehicle speed representing value derivation circuit $27a$ includes comparators 59 and 60. The comparator 59 has a non-inverting input terminal connected to the wheel speed derivation circuit $31a$. On the other hand, the comparator 60 is connected to the wheel speed derivation circuit $31a$ at an inverting input terminal. An inverting input terminal of the comparator 59 is connected to output terminal of the vehicle speed representing value derivation circuit $27a$ through which the vehicle speed representing value $Vi_1$ is output, through an adder 61. On the other hand, the non-inverting input terminal of the comparator 60 is connected to the output terminal of the vehicle speed representing value derivation circuit $27a$ through a substractor 62. The adder 61 is designed to add a given value corresponding to 1 km/h of vehicle speed to the vehicle speed representing value $Vi_1$ for providing a dead band of +1 km/h. The value of the sum of the vehicle speed representing value $Vi_1$ and the dead band value 1 km/h will be hereafter referred to as the higher vehicle speed reference value. Similarly, the subtractor 62 subtracts a given value corresponding to 1 km/h of the vehicle speed from the vehicle speed representing value $Vi_1$ for providing a dead band of −1 km/h. The value of the difference of the vehicle speed representing value $Vi_1$ and the dead band value −1 km/h will be hereafter referred to as the lower vehicle speed reference value. The comparator 59 outputs a HIGH level comparator signal when the wheel speed $Vw_1$ is higher than or equal to the higher vehicle speed reference value ($Vi_1+1$ km/h). In other words, the comparator signal level of the comparator 59 is held LOW as long as the wheel speed $Vw_1$ is maintained lower than the lower vehicle speed reference value ($Vi_1+1$ km/h). The comparator 60 outputs HIGH level comparator signal when the wheel speed $Vw_1$ is lower than to the lower vehicle speed reference value ($Vi_1−1$ km/h). In other words, the comparator signal level of the comparator 59 is held LOW as long as the wheel speed $Vw_1$ is maintained higher than or equal to the lower vehicle speed reference value ($Vi_1 - 1$ km/h).

The output terminals of the comparators 59 and 60 are connected to input terminals of NOR gate 63 to feed the comparator signals $c_1$ and $c_2$ thereto. The NOR gate 63 outputs HIGH level gate signal while signal levels of both of the comparator signals $c_1$ and $c_2$ are maintained LOW. Namely, the gate signal output from the NOR gate 63 is held LOW while the wheel speed $Vw_1$ is maintained higher than or equal to the vehicle speed representing value $Vi_1 - 1$ km/h). The gate signal of the NOR gate 63 is fed to a timer 64, an OR gate 65 and a shot-pulse generator 66, respectively. The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the the NOR gate signal at one input terminal and the timer signal from the timer 64 at the other input terminal. An OR gate signal of the OR gate 65 is transmitted to a gate of an analog switch 67 as a selector signal $S_3$. The output terminal of the OR gate 65 is also connected to one input terminal of an AND gates 69 and 70 via an inverter 68. The other input terminal of the AND gate 69 is connected to the output terminal of the comparator 59 to receive therefrom the comparator signal $c_1$. Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at a HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration, e.g. 0.4 G, to the integrator circuit 73.

The analog switch 72 is connected to a longitudinal acceleration dependent deceleration gradient generator circuit 100. The longitudinal acceleration dependent deceleration gradient generator circuit 100 is connected to the aforementioned longitudinal acceleration sensor 47 and comprises an absolute value circuit 91, an adder circuit 93, an offset value generator circuit 92 and an inverter circuit 90. The absolute value circuit 91 is directly connected to the longitudinal acceleration sensor 47 for receiving therefrom the longitudinal acceleration indicative sensor signal. As set forth, the longitudinal acceleration indicative sensor signal has a positive value when the longitudinal acceleration exerted on the vehicle body is backward acceleration causing vehicular deceleration and a negative value when the longitudinal acceleration exerted on the vehicle body is forward acceleration causing acceleration of the vehicle. The magnitude of the longitudinal acceleration indicative sensor signal is variable depending upon acceleration and deceleration acting on the vehicle body. Therefore, the absolute value output from the absolute value circuit 91 represents magnitude of longitudinal acceleration regardless the direction thereof. The output of the absolute value circuit 91 is fed to the adder circuit 93. The adder circuit 93 also receives an offset value indicative signal which represents an offset value, e.g. 0.3 G. The offset value of the offset value generator circuit 91 is selected so as not to cause significant influence in derivation of the projected vehicular speed representative data Vi. In the adder circuit 93, the offset value of the offset value generator circuit 91 is added to the absolute value output of the absolute value generator circuit 91. Therefore, the output of the adder circuit 93 is offset from the output of the absolute value circuit 91 in a magnitude corresponding to the offset value of the offset value generator circuit 92. The output of the adder circuit 93 is fed to the inverter circuit 90. The inverter circuit 90 inverts the received adder output to produce the deceleration gradient indicative data $-m$ on the basis of the received adder output.

The analog switch 72 will be likewise turned ON in response to the HIGH level selector signal $S_4$ to supply a voltage corresponding to possible minimum wheel acceleration value.

The integrator circuit 73 has a per se well known construction and includes an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output the integrator signal. The shot-pulse generator 66 is responsive to an ON-set signal IG of an ignition switch to generate a first shot pulse as the first reset signal for resetting the integrator circuit 73. The shot-pulse generator 66 subsequently generates the shot-pulses serving as the reset signal $S_1$ at every leading edge of the HIGH level NOR gate signal. As set forth above, since the NOR gate signal becomes HIGH when the wheel speed $Vw_1$ satisfies $(Vi_1 - 1$ km/h$) \leq Vw_1 < (Vi_1 + 1$ km/h$)$, the integrated value of the integrator 73 is reset every occurrence of the wheel speed $Vw_1$ in the aforementioned range. The reset signal $S_1$ of the shot-pulse generator 66 is also supplied to a sample hold circuit 77. The sample hold circuit 77 comprises a buffer amplifiers 78 and 79, a capacitor 80 and an analog switch 81. The analog switch 81 is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value $Vw_1$ at the occurrence of the reset signal as a sample value Vs. The sample hold circuit 77 outputs a sample/hold signal having a value indicative of the sample value Vs to an adder 82. The adder receives the sample/hold signal from the sample hold circuit 77 and integrator signal from the integrator 73. As will be appreciated, the integrator signal has a value indicative of an integrated value $$Ve\left(= \int_0^t (-E) \cdot dt\right).$$

Therefore, the adder 82 addes the integrated value Ve to the sample value Vs to derive the vehicle speed representing value $Vi_1$. The output terminal of the adder 82 is connected to a switching circuit 83. The switching circuit 83 is also directly connected to the wheel speed derivation circuit 31a to input the wheel speed signal. On the other hand, the switching circuit 83 also connected to an AND gate 84. The AND gate 84 has one input terminal connected to a retriggerable timer 30 to receive therefrom the pump drive signal MR. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed $Vw_1$ is lower than the $Vi_1 + 1$ km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

The preferred embodiment of a fail-safe system according to the invention will be discussed herebelow with reference to FIGS. 1(A) and 1(B). As seen from FIGS. 1(A) and 1(B), the preferred embodiment of the fail-safe system generally comprises a pulse generator stage 30, a fail detector stage 40 and fail-safe control stage 50. The pulse generator stage 30 comprises first, second and third pulse generator circuits 30a, 30b and 30c. The first pulse generator circuit 30a is associated with the anti-skid brake controller for the right-front wheel. Similarly, the second and third pulse generator circuits 30b and 30c are associated with the left-front wheel and rear wheels. Since the pulse generator circuits 30a, 30b and 30c are of identical constructions, the following discussion concerning the circuit construction and operation thereof will be discussed in connection with the first pulse generator circuit 30a. Furthermore, the fail detector stage 40 also comprise identical constructions of first, second and third fail detectors 40a, 40b and 40c. Therefore, the detailed discussion will be given only for the first fail detector 40a.

The first pulse generator circuit 30a has an AND gate 31a having one input terminal to receive the inlet control signal (EV) from the anti-skid brake control stage. The pulse generator circuit 30a also has another AND gate 33a which has one input terminal to receive the outlet control signal (AV). The other input terminals of the AND gates 31a and 33a are connected to a timer 32a. The timer 32a is connected to the output terminal of the AND gate 31a to receive the inlet control signal (EV) so as to be set by every leading edge of the HIGH level inlet control signal (EV). The timer 32a measures a given period $T_1$, e.g. 1.5 sec. to produce a pulse signal which drops from HIGH level to LOW level and has a substantially short pulse width, e.g. 5 ms. The output of the AND gate 31a is also fed to the EV valve 19a via an amplifier 36a.

Figure 5:
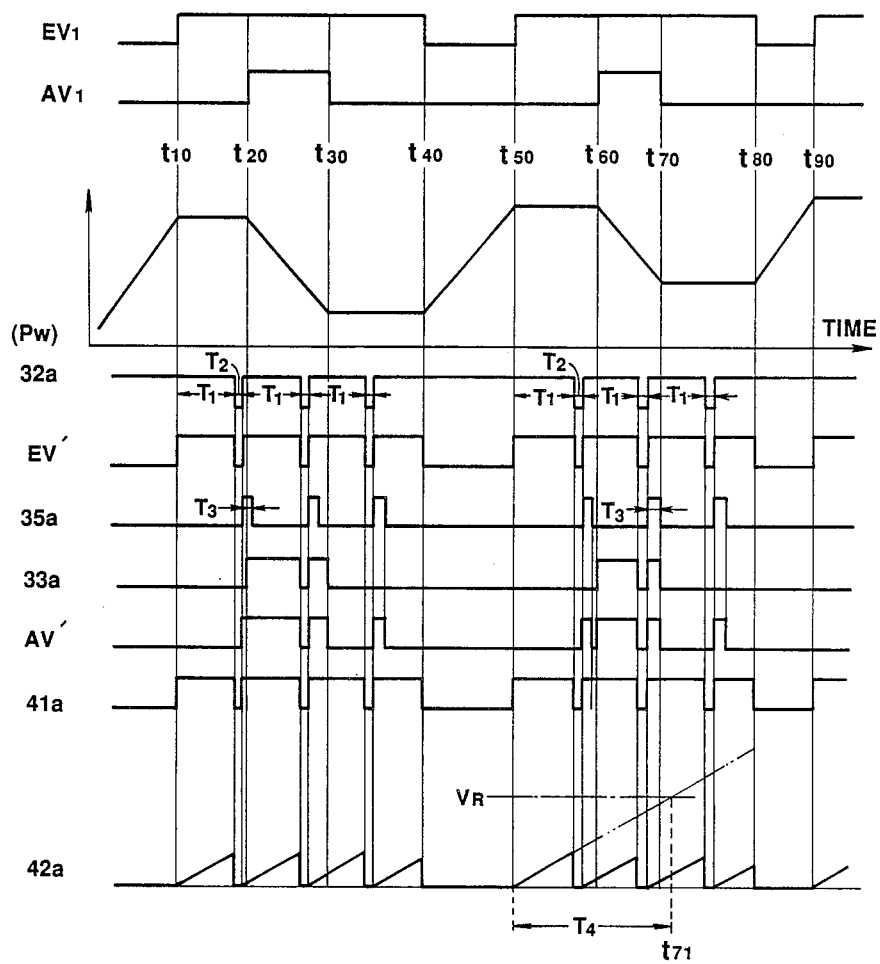
FIG. 5 is a timing chart showing anti-skid brake control operation to be performed by the preferred embodiment of the anti-skid brake control system, including fail-safe operation

The AND gate 33a has the other input terminal connected to the timer 32a to receive the pulse signal output therefrom. The timer 32a is further connected to a timer 35a to feed the pulse signal. The timer 35a is responsive to the trailing edge of the pulse signal of the timer 32a to change level from LOW to HIGH level to produce a HIGH level pulse signal for a given period of time $T_3$. The timer 35a is connected to one input terminal of an OR gate 34a. The other input terminal of the OR gate 34a is connected to the AND gate 33a. With this construction, the waveform of the output of the AND gate 33a while the outlet control signal (AV) is HIGH level, becomes as shown in FIG. 5 to intermittently lower the level at corresponding timing of the pulse signals generated by the timer 31a. On the other hand, while the outlet control signal (AV) is LOW level the OR gate signal intermittently rises to HIGH level at a corresponding timing to occurrence of the pulse signal of the timer 35a. The output of the OR gate 34a is fed to the AV valve 20a via the amplifier 37a.

On the other hand, the amplifiers 36a and 37a are connected to an OR gate 41a of the fail detector 40a. The output terminal of the OR gate 41a is connected to an integrator circuit 42a. The integrator circuit 42a integrates the HIGH level gate signal of the OR gate 41a. On the other hand, the integrator 42a is responsive to change of the gate signal level from HIGH level to LOW level to reset the integrated value. The integrator circuit 42a is connected to the non-inverting input terminal of a comparator 43a. To the inverting input terminal of the comparator 43a, a reference value VR which corresponds to the integrated value for a given period $T_4$ is provided. Therefore, the comparator 43a produces a HIGH level comparator signal when the integrated value of the integrated circuit 42a becomes greater than the reference value VR.

The output terminal of the comparator 43a is connected to a set input terminal of a flip-flop 44a which has a reset input terminal connected to an ignition switch. Therefore, the flip-flop 44a is reset in response to turning ON of the ignition switch and set in response to the HIGH level comparator signal of the comparator 43a. The output terminal of the flip-flop 44a is connected to one input terminal of an OR gate 51 of a fail-safe stage 50. The other input terminals of the OR gate 51 are respectively connected to the output terminals of the flip-flops 44b and 44c of the second and third fail detectors 40b and 40c.

The gate signal of the OR gate 51 turns into HIGH level when one of the inputs from the flip-flops 44a, 44b and 44c is HIGH level. When the gate signal of the OR gate 51 turns into HIGH level, a transistor 52 becomes conductive to power LED fail indicator lamp 53 and turn OFF a transistor 56. By this, a relay coil 55b of a relay switch 55 is deenergized to shift a movable contact 55a of the relay switch to the non-conductive position. Though it is not shown in the drawings, the switch 55a then blocks electric communication to the EV and AV valves 19a, 19b, 19c and 20a, 20b, 20c. As a result, the LOW level signals are applied to the EV values 19a, 19b and 19c to maintain the EV valves open and to the AV valves 20a, 20b and 20c to maintain the AV valves closed. Therefore, when the fail-safe operation is taken place, the operation mode is fixed to the APPLICATION mode.

The operation of the fail-safe system set forth above will be discussed herebelow with reference to the timing chart in FIG. 5. In the example of FIG. 5, the inlet control signal (EV) and the outlet control signal (AV) varies as shown. According to variation of the inlet control signal (EV) and the outlet control signal (AV), braking pressure Pw varies as shown through skid cycles.

At a time $t_{10}$, the inlet control signal (EV) turns into HIGH level. Then, the EV valve 19a is shut to block fluid communication between the master cylinder and the wheel cylinder. The timer 32a is triggered by this HIGH level input control signal (EV) to intermittently or periodically produce the pulse signal which lowers the signal level from HIGH level to LOW level and has the pulse width $T_2$ with an interval $T_1$. By the pulse signals produced by the timer 32a, the outputs of the AND gate 31a to be applied to the EV valve 19a as the inlet control valve (EV') intermittently lower the signal level at the corresponding timing to occurrence of the pulse signals of the timer 31a. As appearing during the periods $t_{10}$ to $t_{40}$ and $t_{50}$ to $t_{80}$, the inlet control signal (EV') which intermittently falls into LOW level appears. As long as the HIGH level inlet control signal (EV') is intermittently or periodically lowered in signal level to clear the integrated value of the integration circuit 42a, judgement can be made that the anti-skid brake control operates in normal condition without failure. On the other hand, as shown by phantom line in the period between $t_{50}$ to $t_{90}$, when the LOW level inlet control signal (EV') does not appear for a period longer than the $T_4$ period, the integrated value becomes greater than the reference value VR, the comparator signal of the comparator 43a becomes HIGH level indicative that failure occurs. Fail-safe operation set forth above then takes place.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 6:
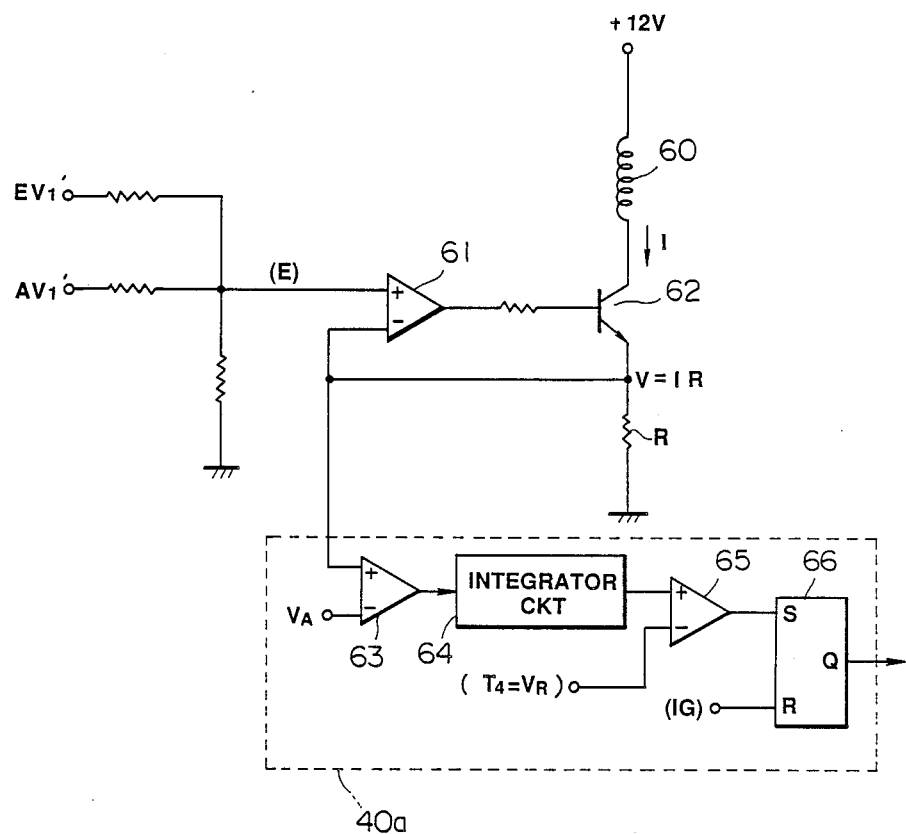
FIG. 6 is a schematic block diagram of another embodiment of a fail-safe system for the anti-skid brake control system, which is also applicable for the shown embodiment of the brake control system.

For example, the present invention is applicable not only for the anti-skid brake control system which is provided with a separate inlet control (EV) valve and outlet control valve (AV) valve, but also for the anti-skid brake control system that is disclosed in Japanese Patent First (unexamined) Publication (Tokkai) Showa 58-53551 and has a single electromagnetic proportioning valve variable between APPLICATION mode, HOLD mode and RELEASE mode. One example of the anti-skid brake control system which employs a single electromagnetic proportioning valve, is shown in FIG. 6. In the circuit construction of FIG. 6, an electromagnetic proportioning valve 60 is connected to a power source, i.e. vehicular battery, and in turn, to the ground via a switching transistor 62 and a resistor R.

The base electrode of the switching transistor 62 is connected to an operational amplifier 61 which has a non-inverting input terminal receiving a sum value of the inlet control signal $EV_1'$ and the outlet control signal $AV_1'$. The inverting input terminal of the operational amplifier 61 is connected to a junction between the emitter electrode of the switching transistor 62 and the resistor R.

With the shown construction, the conductivity of the switching transistor 61 varies in three steps. By this, the electromagnetic proportioning valve 60 can be shifted to APPLICATION mode position, HOLD mode position and RELEASE mode position respectively. Namely, when both of the inlet control signal $EV_1'$ and the outlet control signal $AV_1'$ are maintained LOW level, the sum value to be applied to the non-inverting input terminal of the operational amplifier 62 is maintained to be substantially zero. Therefore, the output of the opertional amplifier is maintained substantially zero to maintain the electromagnetic proportioning valve 60 at the completely energized position. This valve position corresponds to the APPLICATION mode in anti-skid brake control. On the other hand, when the inlet control signal $EV_1'$ turns into HIGH level and the outlet control signal $AV_1'$ is also turned into HIGH LOW level, the sum value to be applied to the operational amplifier becomes the sum of the HIGH level inlet and outlet control signals. At this time, the output of the operational amplifier 62 becomes a maximum value to cause the conductivity of the switching transistor 61 to become maximum. As a result, the electromagnetic proportioning valve 60 is fully energized to be placed at a fully shifted position which corresponds to RELEASE mode position. On the other hand, when the inlet control signal $EV_1'$ is HIGH level and the outlet control signal $AV_1'$ is LOW level, the sum value becomes smaller than that obtained when both of the inlet and outlet control signals are HIGH level. Then, the output of the operational amplifier becomes smaller value than that obtained when both of the inlet and outlet control signals are HIGH level. Therefore, conductivity of the switching transistor 61 has a limited magnitude for causing shift of the electromagnetic proportioning valve 60 in a limited manner. This valve position corresponds to the HOLD mode position.

In this case, a fail-safe detector circuit 40a which substantially corresponds to the former embodiment can be associated to detect failure of the control system. In the shown example, the non-inverting input terminal of a comparator 63 is connected to the junction between the emitter electrode of the switching transistor 62 and the resistor R. To the inverting input terminal of the comparator 63, as reference level signal VA which represents the gate signal level at the gate electrode of the switching transistor 62 to cause RELEASE mode or HOLD mode positioning of the electromagnetic proportioning valve 60. The output terminal of the comparator 63 is connected to an integrator 64 to integrate a time in which the comparator signal is maintained at HIGH level. Therefore, similarly to the foregoing embodiment, the integrator 64 integrated a period while the inlet control signal $EV_1'$ is maintained HIGH level. The output of the integrator 64 is connected to the non-inverting input terminal of a comparator 65 which has an inverting input terminal receiving the reference signal VR.

The comparator 65 produces a HIGH level comparator signal when the integrated value becomes greater than or equal to the reference signal value VR. The comparator signal is fed to the set input terminal of a flip-flop 66. The flip-flop 66 is set by the HIGH level comparator signal to produce HIGH level signal which serves as fail indicative signal.

In the shown construction, since the inlet control signal EV$_1$' is periodically lowered in signal level by a pulse generator circuit the same as or equivalent to the pulse generator stage 30 of the former embodiment, the integrated value is periodically reset at a timing shorter than the period T$_4$ represented by the reference signal VR. Therefore, as long as the system operates in normal condition, the HIGH level comparator signal of the comparator 65 will never be generated. Therefore, by detecting the integrated value greater than or equal to the reference signal value VR, failure of the system can be detected.

Therefore, the present invention fulfills all of the objects and advantages sought therefor.

What is claimed is:

1. A fail-safe system for an anti-skid brake control system, said fail-safe system comprising:
    a hydraulic brake circuit having means for building up braking fluid pressure according to an operational magnitude of a manually operable braking and braking force generating means, associated with a vehicular wheel, for generating braking force to decelerate said vehicular wheel;
    a pressure adjusting means, disposed within said hydraulic brake circuit, for adjusting pressure of a working fluid to be delivered to said braking force generating means, said pressure said adjusting means being operable at least in a first mode for increasing braking pressure in said braking force generating means and in a second mode for decreasing said braking pressure;
    a sensor means for monitoring a rotation speed of said vehicular wheel to produce a sensor signal representative of said rotation speed of said vehicular wheel;
    controller means for processing said rotation of said vehicular wheel in order to derive a wheel slippage and for generating a control signal for said pressure adjusting means for switching an operational mode of said pressure adjusting means between said first and second modes as as to maintain wheel slippage close to a predetermined value;
    pulse generator means, associated with said controller means, for periodically generating a pulse signal having a substantially short pulse width, said pulse signal being combined with said control signal for periodically modifying said control signal to produce a periodically occurring control signal to periodically order said first mode;
    detector means for detecting an interval of said periodically occurring control signal ordering said first mode longer than a predetermined period to produce a fail detection signal; and
    fail-safe means, responsive to said fail detection signal, for preforming fail-safe operation to fix said pressure adjusting means at said first mode.

2. A fail-safe system as set forth in claim 1, wherein said pulse generator means is active while said pressure adjusting means is in said second mode periodically causing said control signal to order said first mode for a substantially short period.

3. A fail-safe system as set forth in claim 1, wherein said detector means comprises an integrator circuit which integrates a period of said control signal while said pressure adjusting means is maintained in said second mode, and a comparator receiving an integrated value of from said integrator circuit to compare said integrated value with a reference value representative of said predetermined period to produce said fail detection signal when said integrated value becomes greater than or equal to said reference value.

4. A fail-safe system as set forth in claim 1, further comprising holding means for said fail detection signal throughout vehicular driving.

5. A fail-safe system a set forth in claim 4, wherein said holding means is reset in response to turning ON an ignition switch.

6. A fail-safe system as set forth in claim 1, wherein said predetermined period is set at a longer period than an interval of said pulse signal.

7. A fail-safe system as set forth in claim 1, wherein said pulse width is shorter than a width of said periodically occurring control signal when said periodically occuring control signal orders said second mode, said pulse width being short enough so that said braking pressure is not significantly affected by said pulse signal.

8. A fail-safe system for an anti-skid brake control system, said fail-safe system comprising:
    a hydraulic brake circuit having means for building up braking fluid pressure according to an operational magnitude of a manually operable braking member, and braking force generating means, associated with a vehicular wheel, for generating braking force to decelerate said vehicular wheel;
    a pressure adjusting means, disposed within said hydraulic brake circuit, for adjusting pressure of a working fluid to be delivered to said braking force generating means, said pressure adjusting means being operable in a first mode for increasing braking pressure in said braking force generating means and in a second mode for decreasing said braking pressure and in a third mode for holding said braking pressure constant;
    a sensor means for monitoring a rotation speed of said vehicular wheel to produce a sensor signal representative of said rotation speed of said vehicular wheel;
    controller means for processing said rotation speed of said vehicular wheel in order to derive a wheel slippage and for generating a control signal for said pressure adjusting means for switching an operational mode of said pressure adjusting means between said first and second modes so as to maintain said wheel slippage close to a predetermined value, said control signal being variable among a first level ordering said first mode, a second level ordering said second mode and a third level ordering said third mode;
    pulse generator means, associated with said controller means, for periodically generating a pulse signal having a substantially short pulse width, said pulse signal being combined with said control signal for periodically modifying a signal level of said control signal from a signal level other than said first level to said first level;
    detector means for detecting an interval of said periodically occurring first level control signal longer than a predetermined period to produce a fail detection signal; and fail-safe means, responsive to said fail detection signal, for performing fail-safe operation to fix said control signal at said first level.

9. A fail-safe system as set forth in claim 8 wherein said pulse generator means is active while said pressure adjusting means is in said second mode periodically causing said control signal to be at said first level.

10. A fail-safe system as set forth in claim 8, wherein said detector means comprises an integrator circuit which integrates a period of said control signal while said pressure adjusting means is maintained in said second mode, and a comparator receiving an integrated value from said integrator circuit to compare said integrated value with a reference value representative of said predetermined period to produce said fail detection signal when said integrated value becomes greater than or equal to said reference value.

11. A fail-safe system as set forth in claim 8, further comprising holding means for holding said fail detection signal throughout vehicular driving.

12. A fail-safe system as set forth in claim 11, wherein said holding means is reset in response to turning ON an ignition switch.

13. A fail-safe system as set forth in claim 8, wherein said predetermined period is set at a longer period than an interval of said pulse signal.

14. A fail-safe system as set forth in claim 8, wherein said pulse width is shorter than width of said control signal when said control signal is at said signal level other than said first level, said pulse width being short enough so that said braking pressure is not significantly affected by said pulse signal.

* * * * *